United States Patent
Gorti et al.

(10) Patent No.: US 11,586,440 B2
(45) Date of Patent: Feb. 21, 2023

(54) LINK STACK BASED INSTRUCTION PREFETCH AUGMENTATION

(71) Applicant: INTERNATIONAL BUSINESS MACHINES CORPORATION, Armonk, NY (US)

(72) Inventors: Naga P. Gorti, Austin, TX (US); Mohit Karve, Austin, TX (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 17/336,240

(22) Filed: Jun. 1, 2021

(65) Prior Publication Data

US 2022/0382552 A1    Dec. 1, 2022

(51) Int. Cl.
*G06F 8/20* (2018.01)
*G06F 9/38* (2018.01)

(52) U.S. Cl.
CPC .......... *G06F 9/3814* (2013.01); *G06F 9/3842* (2013.01)

(58) Field of Classification Search
CPC ..... G06F 9/3814; G06F 9/3806; G06F 9/3802
See application file for complete search history.

(56) References Cited

U.S. PATENT DOCUMENTS

| | | | | |
|---|---|---|---|---|
| 5,761,468 A * | 6/1998 | Emberson | ............... | G06F 9/383 712/E9.055 |
| 5,964,867 A * | 10/1999 | Anderson | ............... | G06F 9/383 712/216 |
| 5,964,868 A * | 10/1999 | Gochman | ............. | G06F 9/3842 712/237 |
| 6,289,444 B1 * | 9/2001 | Nair | ....................... | G06F 9/3806 712/216 |
| 6,973,563 B1 * | 12/2005 | Sander | .................. | G06F 9/3844 712/242 |
| 8,341,383 B2 * | 12/2012 | Dieffenderfer | .......... | G06F 9/322 712/243 |
| 9,817,789 B2 | 11/2017 | Jain | | |
| 10,095,543 B1 | 10/2018 | Griffin et al. | | |
| 10,387,319 B2 | 8/2019 | Adler et al. | | |
| 2003/0120906 A1 * | 6/2003 | Jourdan | ................ | G06F 9/3802 712/228 |
| 2006/0190711 A1 * | 8/2006 | Smith | .................. | G06F 9/30054 712/E9.083 |
| 2018/0122431 A1 * | 5/2018 | Hinton | ................. | G11C 7/1036 |

OTHER PUBLICATIONS

Hennessy-Patterson, "Computer Architecture a Quantitative Approach", 2007, Morgan Kaufmann Publishers, 4th edition, p. 69 (Year: 2007).*

(Continued)

*Primary Examiner* — Cheng Yuan Tseng
(74) *Attorney, Agent, or Firm* — Intelltetek Law Group, PLLC; Gabriel Daniel, Esq.

(57) ABSTRACT

A computer-implemented method of performing a link stack based prefetch augmentation using a sequential prefetching includes observing a call instruction in a program being executed, and pushing a return address onto a link stack for processing the next instruction. A stream of instructions is prefetched starting from a cached line address of the next instruction and is stored in an instruction cache.

18 Claims, 6 Drawing Sheets

(56) References Cited

OTHER PUBLICATIONS

Anonymous, "A Methodology for Effective Insertion of Software Instruction Prefetchs for Return Branch Predictions"; ip.com Number: ip.com, IPCOM000223699D, Nov. 23, 2012; 6 pgs.
Anonymous, "Defending Method of Stack Smashing Attack"; ip.com, IPCOM000245305D Feb. 29, 2016; 7 pgs.
Le, H. Q., et al., "IBM Power6 Microarchitecture"; IBM J. Res. & Dev. (2007); vol. 51 No. 6; pp. 639-662.
Sinharoy, B. et al., "IBM Power8 Processor Core Microarchitecture"; IBM J. Res. & Dev. (2015); vol. 59 No. 1; 22 pgs.
Mell, P. et al., "Recommendations of the National Institute of Standards and Technology"; NIST Special Publication 800-145 (2011); 7 pgs.

\* cited by examiner

LINK STACK BASED INSTRUCTION PREFETCH AUGMENTATION

BACKGROUND

Technical Field

The present disclosure generally relates to systems and methods for operating a processor that employs a pipeline architecture, and more particularly, to configuring link stacks used to push and pop streams of instructions for execution by the processor.

Description of the Related Art

Current computing devices include processors using circuits for implementing or emulating a link stack. Link stacks can be defined as last in first out (LIFO) structures configured to store link addresses for instructions such as subroutines for execution. For example, a branch and link instruction pushes an address (e.g., a link address) of a next instruction (e.g., a first subroutine) onto the link stack to be executed by a processor. A return instruction then pops the address off the link stack as the first subroutine finishes being executed (or calls a second subroutine to executed) and returns to the address following the address that called the first subroutine. Link addresses are pushed onto the link stack and popped off the link stack in succession as the subroutines are executed and returned to fetch from the memory a link address of another next instruction for execution.

In a pipeline architecture, instructions should continuously flow through the pipeline to maximize an efficiency of a processor operation. Conditional branching is commonly used in such operations, and branch prediction is employed to fetch and process instructions from a predicted store address (rather than waiting for an actual called store address) in an effort to reduce/prevent pipeline stalls. Caching is often used to have anticipated branch instructions available for the pipeline with a minimal delay.

SUMMARY

According to one embodiment, computer-implemented method of performing a link stack based prefetch augmentation using sequential prefetching includes observing a call instruction in a program being executed, and pushing a return address onto a link stack for processing the next instruction. A stream of instructions is prefetched starting from a cached line address of the next instruction. The stream of instructions is stored in an instruction cache.

In an embodiment, the method includes observing another call instruction prior to returning from the currently called function, pushing the new next instruction onto the link stack, and prefetching a stream of lines starting from a cache line that includes the new next instruction.

In an embodiment, the return address of the new instruction and a return address of the next new instruction are non-sequential. The method further includes performing a branch prediction using a call graph information to predict a next non-sequential address to which the program will jump, and prefetching the instructions from the predicted next non-sequential address.

In an embodiment, the prefetched instructions from the next non-sequential address are processed. The result of the executed prefetched instructions is stored in a cache memory coupled to a processing pipeline. This event occurs prior to receiving a function call for the instructions at the predicted next non-sequential address.

In an embodiment, a function call return of the next instruction is performed after processing of the next instruction has ended, and a prefetching of the stream of instructions starting from the cache line address of the next return instruction on the link stack is re-performed in response to determining whether the stream of instructions prefetched into the instruction cache has been overwritten.

In an embodiment, the next instruction is popped off the link stack after being processed, and prefetching of one or more streams of instructions starting from cache lines having a top N addresses stored in the link stack is performed.

In an embodiment, subroutine candidates to be called by the link stack are predicted. The sequential prefetcher prefetches the addresses of the predicted subroutines. The predicted subroutines are stored in a cache memory coupled to a processing pipeline.

In an embodiment, the predicted subroutines are processed and storied in the cache memory.

In an embodiment, one or more jumps in a program code are identified in advance of a function call return. Non-sequential prefetching is performed using information stored in the link stack.

According to one embodiment, a computing device configured to perform a link stack based prefetch augmentation includes a processor, a memory coupled to the processor, and a sequential prefetcher coupled to the memory. The memory stores instructions to cause the processor to perform acts including calling a function using a next call instruction. The return address of the call is pushed onto a link stack for processing instructions for processing of the next instruction. A stream of instructions is prefetched starting from a return address of the next instruction. The stream of instructions is pushed onto the link stack.

According to an embodiment, a non-transitory computer readable storage medium tangibly embodies a computer readable program code having computer readable instructions that, when executed, causes a computer device to carry out a method of performing a link stack based prefetch augmentation using sequential prefetching. The method includes observing a call instruction in a program being executed and pushing a return address onto a link stack for processing instructions. A stream of instructions is prefetched starting from a pushed return address of the next call instruction. The stream of instructions is stored in an instruction cache.

These and other features will become apparent from the following detailed description of illustrative embodiments thereof, which is to be read in connection with the accompanying drawings.

BRIEF DESCRIPTION OF THE DRAWINGS

The drawings are of illustrative embodiments. They do not illustrate all embodiments. Other embodiments may be used in addition to or instead. Details that may be apparent or unnecessary may be omitted to save space or for more effective illustration. Some embodiments may be practiced with additional components or steps and/or without all the components or steps that are illustrated. When the same numeral appears in different drawings, it refers to the same or like components or steps.

DETAILED DESCRIPTION

Overview

In the following detailed description, numerous specific details are set forth by way of examples to provide a thorough understanding of the relevant teachings. However, it should be understood that the present teachings may be practiced without such details. In other instances, well-known methods, procedures, components, and/or circuitry have been described at a relatively high level, without detail, to avoid unnecessarily obscuring aspects of the present teachings.

Instruction prefetching can be sequential or non-sequential. Sequential prefetchers only prefetch cache lines consecutive to a current line being worked upon. Sequential prefetchers are densely arranged because only a few bits are used to determine whether the program requires the next few instruction cache lines, based on a depth (e.g., a storage capacity) of the prefetcher.

Nonsequential prefetchers can capture program behavior that encompasses relatively large "jumps" in storage between instructions. For example, there can be different amounts of storage space between instructions. The amount of jump between two instructions (e.g., A→B), which is symbolized by delta Δ, is stored in non-sequential prefetching. Thus, the storing and tracking of the delta uses bits, which results in a less dense prefetcher than a sequential prefetcher.

Figure 1:
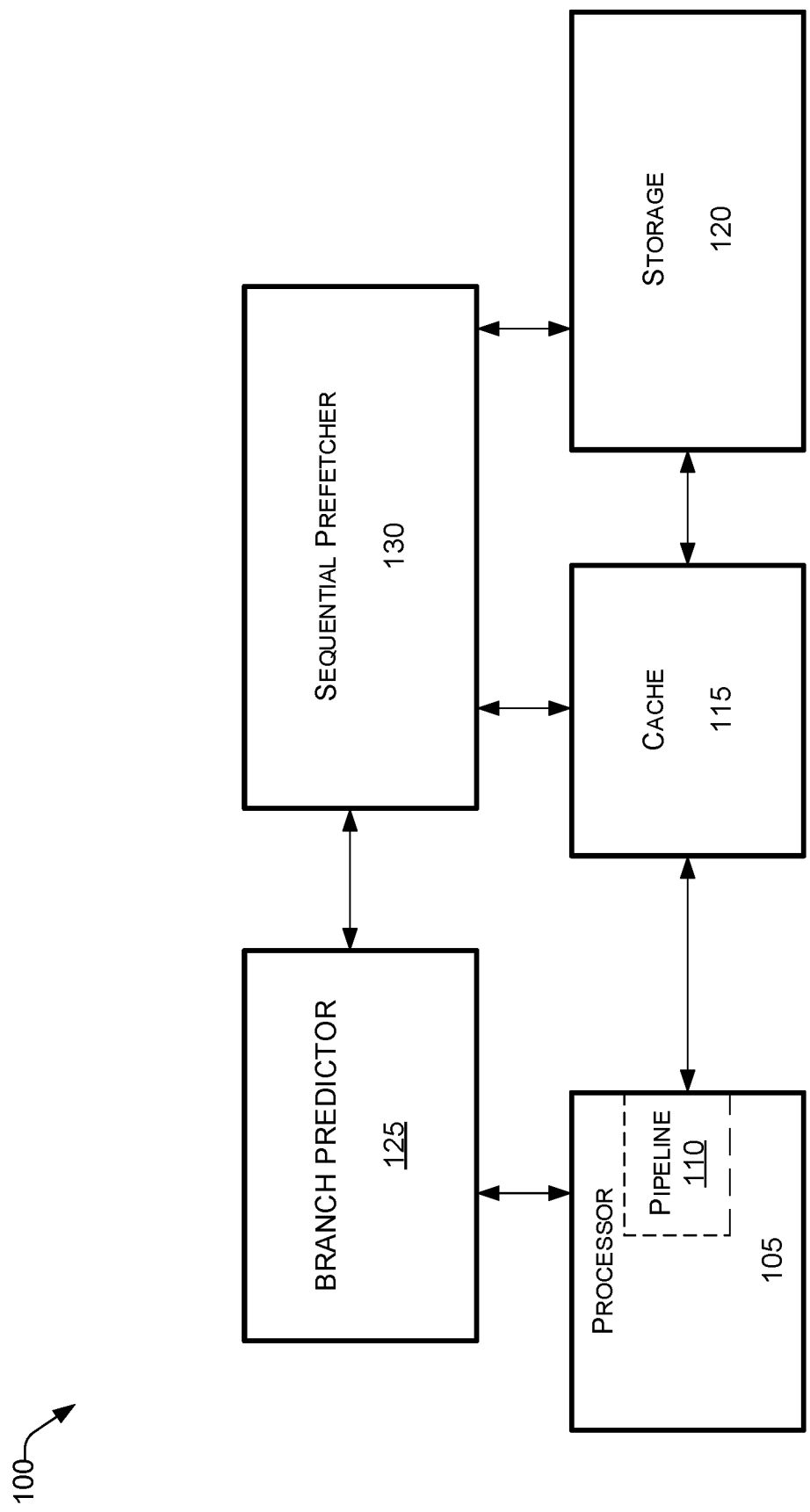
FIG. 1 is an overview illustrating a conceptual architecture of a link stack based sequential prefetcher system, consistent with an illustrative embodiment.

FIG. 1 is an overview 100 illustrating a conceptual architecture of a link stack based sequential prefetcher system, consistent with an illustrative embodiment. It is to be understood the components are shown in separate boxes for illustrative purposes. The processor 105 is typically a central processing unit (CPU) having a pipeline architecture. The pipeline 110 shown can be a multiple pipeline structure that receives instructions from a memory, which is shown as a cache 115 and a storage 120. The pipeline 110 can be part of the processor and can used for performing fetch-decode-execute operations. The branch predictor 125 is configured to estimate which subroutines may be called by the processor 105, and can instruct the sequential prefetcher 130 to fetch the addresses of one or more sequential instructions and store them in the cache. A link stack/function call stack stores addresses of a next instruction following the processing of a called function. The link stack/function call stack may be arranged in the cache 115 or in the processor 105.

Sequential prefetchers cannot accurately predict large jumps in code, which can lead to cache misses that can stall the processor to wait for the missed instruction to be fetched. In one embodiment, information stored in the link stack is used by the sequential prefetcher 130 to trigger non-sequential prefetch requests ahead of time. Thus, the computer-implemented method and computer device of the present disclosure has the benefits of a sequential prefetcher (such as smaller physical footprint and relatively simple algorithms, as compared with non-sequential fetchers), and is an improvement over conventional sequential prefetchers in that the capability to predict certain long jumps in code can be performed in advance. Previously, predicting one or more long jumps in code could only be performed by a non-sequential prefetcher.

By virtue of the teachings herein, the computer-implemented method and computer device of the present disclosure advantageously provides improved performance as cache misses can be reduced or eliminated, preventing processor stalls. There is an improvement in the field of pipeline architecture, as well as an improvement in computer operation. For example, the reduction or elimination in cache misses provides an improvement in computer operation because the program execution will be faster with fewer cache misses. Another improvement in computer operation includes a reduction in processing overhead, as well as a reduction in power consumed.

Additional advantages of the computer-implemented method and device of the present disclosure are disclosed herein.

Example Embodiment

Figure 2:
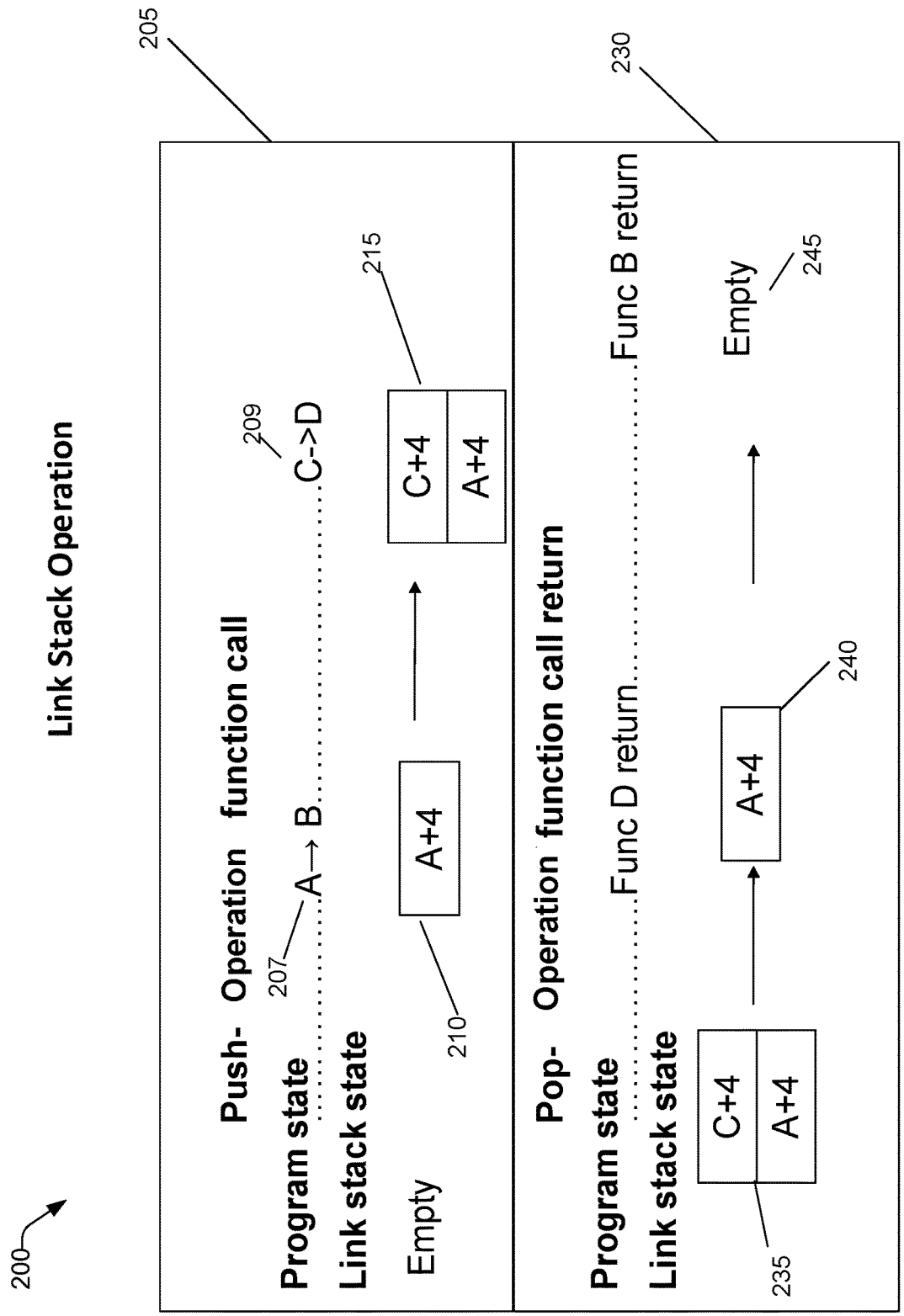
FIG. 2 illustrates a link stack operation, consistent with an illustrative embodiment.

FIG. 2 illustrates a link stack operation 200, consistent with an illustrative embodiment. Link stacks are controlled using push operations 205 and pop operations 230. For example, in a push operation, an address of an instruction (or an address of a subroutine) immediately following the call instruction is pushed onto the stack in response to a function call. When the processor 105 (see FIG. 1) completes processing the function, a call return instruction pops the address of the subroutine or instruction off the stack in order to return to the next instruction after the function call. In FIG. 2, the prefetching is sequential prefetching.

In the push operation 205, it is shown that the program state has various function calls. For example, at 207 it is shown that a function A calls a function B (represented by A→B). However, after executing function B, the program will seek to finish executing function A. Either or both of functions A and B may be subroutines. Subroutine (A) may call another subroutine (B) for execution prior to finishing the execution of the first subroutine (A). When the execution of function B is complete, the link stack 210 stores the information regarding where to continue executing function A. The value (A+4) 210 represents 4 bytes added to the call instruction's address, and is the instruction address of an instruction that immediately follows the call instruction. It is to be understood that the addition of 4 bytes in this illustrative embodiment is specific to an architecture that uses 4-byte instructions. Other architectures may store a different offset. The offset itself is not important, merely that the link stack stores the address for the next instruction after the function call. This address will be stored in a branch predictor (such as a link stack). As represented by the dots, after the function B is executed function C may be performed. Before function C completes, the function C may call the function D for execution (as indicated by C→D 209). At this stage, the link stack is updated with the address of C+4 (next instruction after completing function C), which is pushed onto the link stack over A+4, because the link stack is keeping track of where the two functions (A and C) are to return to complete their execution.

In a pop operation 230, where there is a function call return for function D. Subsequently there is a function call return for function B. There is also shown the link stack state 235 in which C+4 and A+4 are on the stack (in other words, there were no additional calls since the call of function D in the push 205 above. When there is the call return from function D, it is shown that A+4 is now at the top of the link stack 240. Then when the call return from function B is performed, the A+4 is popped off the link stack that now shows as being empty 245.

Figure 3:
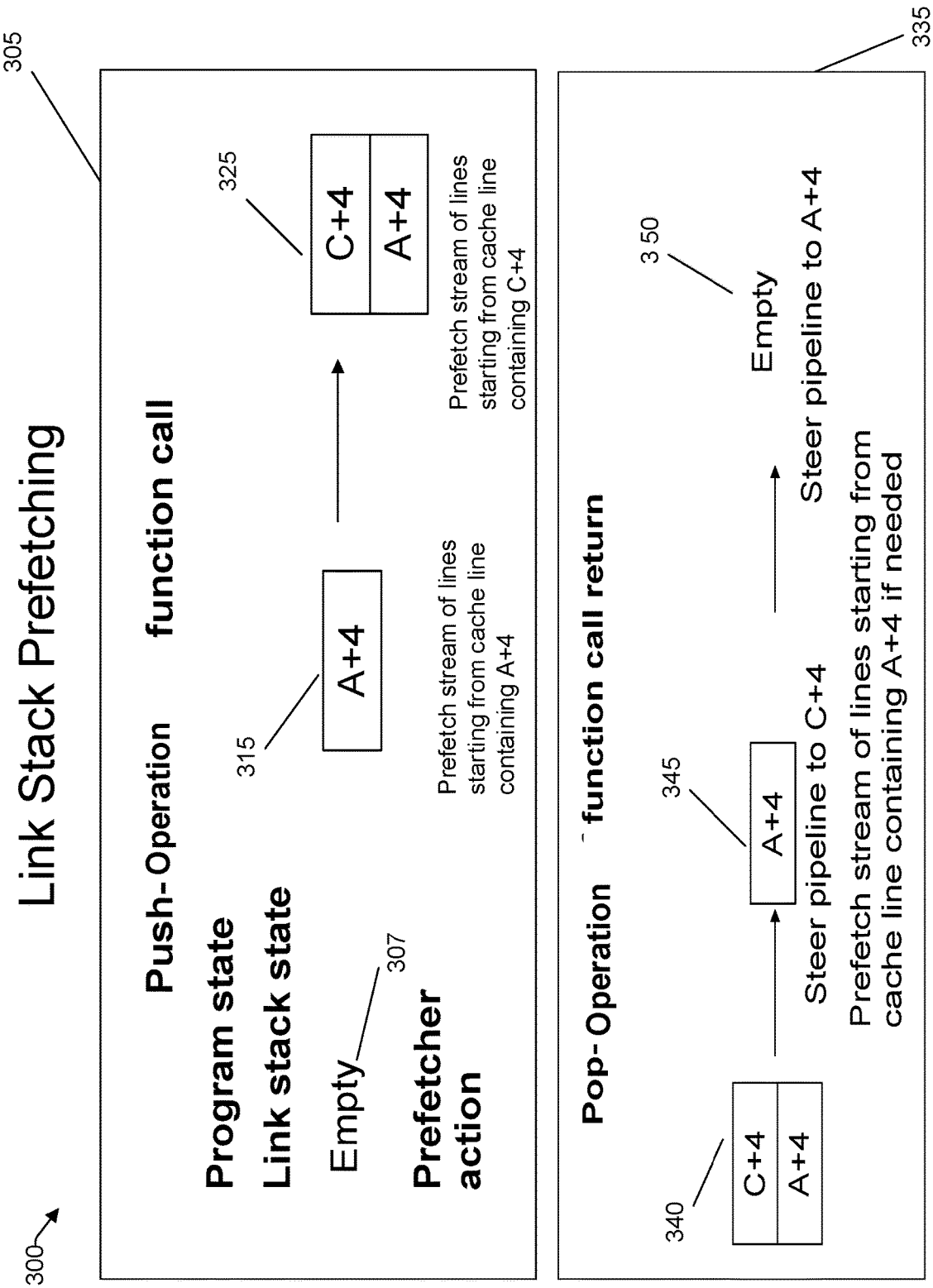
FIG. 3 illustrates a link stack prefetching, consistent with an illustrative embodiment.

FIG. 3 illustrates a link stack prefetching 300, consistent with an illustrative embodiment. FIG. 3 shows push operations 305 and pop operations 335. In the push operation, starting with the empty 307 link stack, A+4 (315) and C+4 (325) are pushed onto the link stack. In one example, the sequential prefetcher 130 (see FIG. 1) will prefetch a stream of lines starting from the cache line including A+4 and store the prefetched cache lines in the instruction cache (see FIG. 1). Then after C+4 is pushed onto the link stack 325, the prefetcher will prefetch a stream of lines starting from the cache line including C+4. Thus, the sequential prefetcher will have the stream of lines ready when there is a return call.

Referring to a function call return operation 335, the link stack has C+4 and A+4 (335), and upon a return call to C+4, the pipeline is steered to C+4, leaving A+4 (345) on the stack. As the C+4 stream of cache lines has been prefetched, the remainder of function C is readily executed. It can be checked whether the prefetched stream of cache lines starting from the cache line including A+4 is still present in the instruction cache. In the event that A+4 may have been rolled over, then another prefetch can be performed prior to the function call return to A+4 taking place. In other words, there is another opportunity to ensure a more efficient operation, as the stream of lines starting from A+4 345 were prefetched in the push operation, but can be prefetched again if they were rolled over (e.g., overwritten), and this would occur preferably prior to the program issuing a function call return to A+4 345. This operation ensures a more efficient operation. Then the pipeline will be steered to A+4, 345 thus leaving the link stack empty 350. It is to be understood that the number of prefetchers and the number of function calls and function call returns have been provided for illustrative purposes. Other number of prefetchers and/or function calls are within the scope of the present disclosure.

Example Process

With the foregoing overview of the example architecture, it may be helpful now to consider a high-level discussion of an example process. To that end, FIGS. 4A and 4B are flowcharts illustrating prefetching operations consistent with an illustrative embodiment. FIGS. 4A and 4B are shown as a collection of blocks, in a logical order, which represents a sequence of operations that can be implemented in hardware, software, or a combination thereof. In the context of software, the blocks represent computer-executable instructions that, when executed by one or more processors, perform the recited operations. Generally, computer-executable instructions may include routines, programs, objects, components, data structures, and the like that perform functions or implement abstract data types. In each process, the order in which the operations are described is not intended to be construed as a limitation, and any number of the described blocks can be combined in any order and/or performed in parallel to implement the process.

FIG. 4A is a flowchart 400A of the activity related to a function call according to an illustrative embodiment. At operation 405, the processor observes a call instruction in the instruction stream from the program. The call instruction may be of any size but is assumed to be 4 bytes long for this example. The address of the next instruction (executed after returning from the called subroutine or function) is the address of the call instruction+4 bytes. This is the return address of the call.

At operation 410, the return address is pushed onto the link stack to aid with branch prediction in the future. If the call instruction was at address A, A+4 is pushed onto the link stack. For the sake of this example, assume that the link stack already had Z+4 stored before A+4 was pushed onto the stack.

At operation 415, the link stack based prefetcher generates prefetches for the address A+4 and a variable number of subsequent cache lines (based on the underlying sequential prefetcher). It is to be understood that the design of the underlying prefetcher is not important—any sequential prefetcher may be used.

FIG. 4B is a flowchart 400B of the activity associated with a function call return according to an illustrative embodiment. At operation 425, the processor observes a return instruction in the instruction stream from the program. If this is the return instruction associated with the call instruction in FIG. 4A, the branch predictor can predict that the address of the return is A+4, as previously stored on the link stack.

At operation 430, the branch predictor pops A+4 off the link stack and uses it to predict the target of the return instruction. At this point the link stack may be empty, or may contain the return address for any number of call instructions that preceded the call instruction at A.

At operation 435, the link stack based instruction prefetcher described in this invention will generate prefetches for the return address at the top of the link stack after the pop in operation 430. In this example, Z+4 is the next return address. The sequential prefetcher in the system will generate a variable number of prefetches starting at Z+4, similar to operation 415. Note that instruction prefetches were also made for Z+4 when it was initially pushed onto the link stack. The operation 435 is the second attempt to prefetch the instructions at and after Z+4 (as described above in in the context of the discussion of FIG. 3.

Example Particularly Configured Computer Hardware Platform

Figure 4:
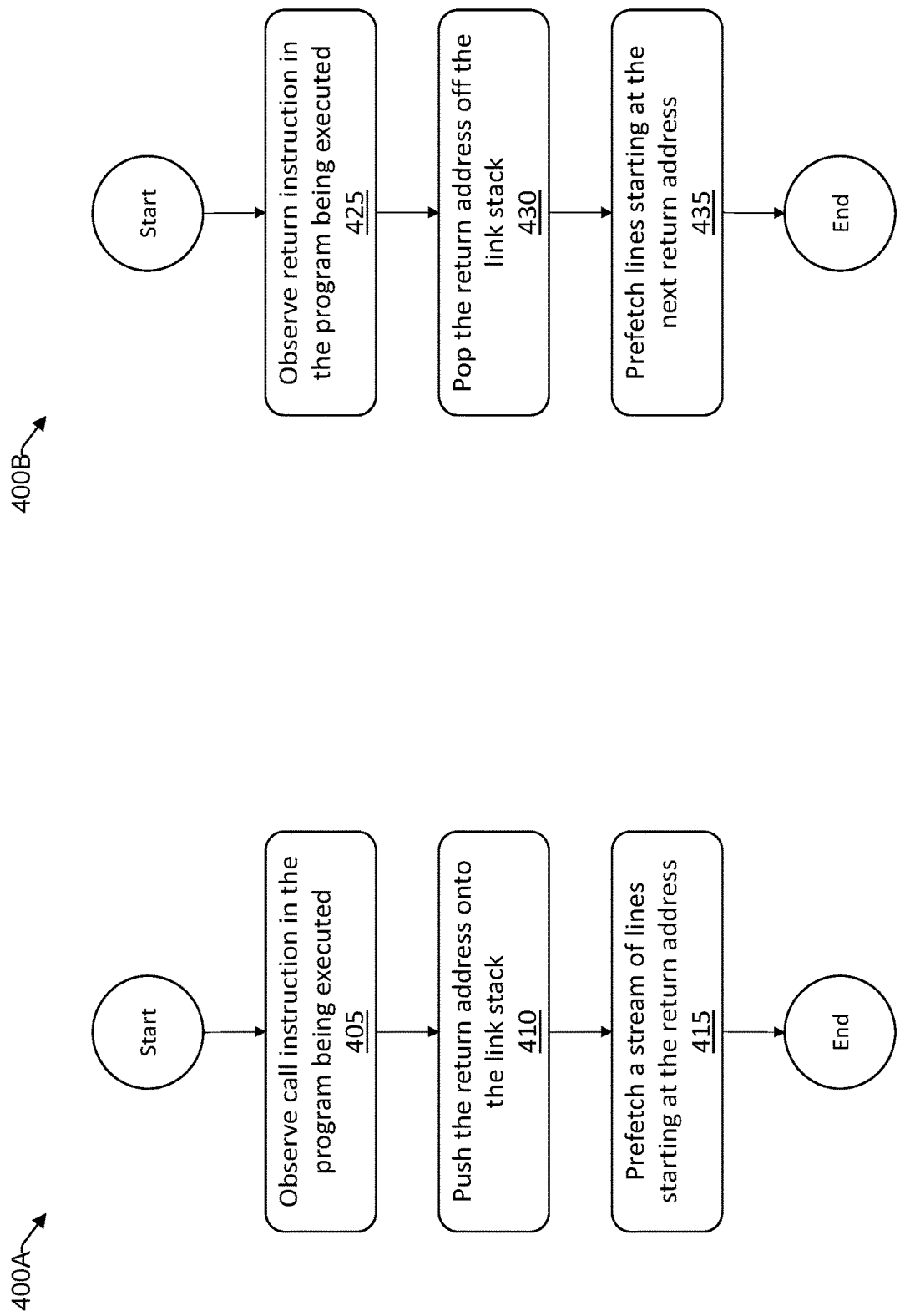
FIG. 4A shows activity related to a function call according to an illustrative embodiment.
FIG. 4B shows activity associated with a function call return according to an illustrative embodiment.
Figure 5:
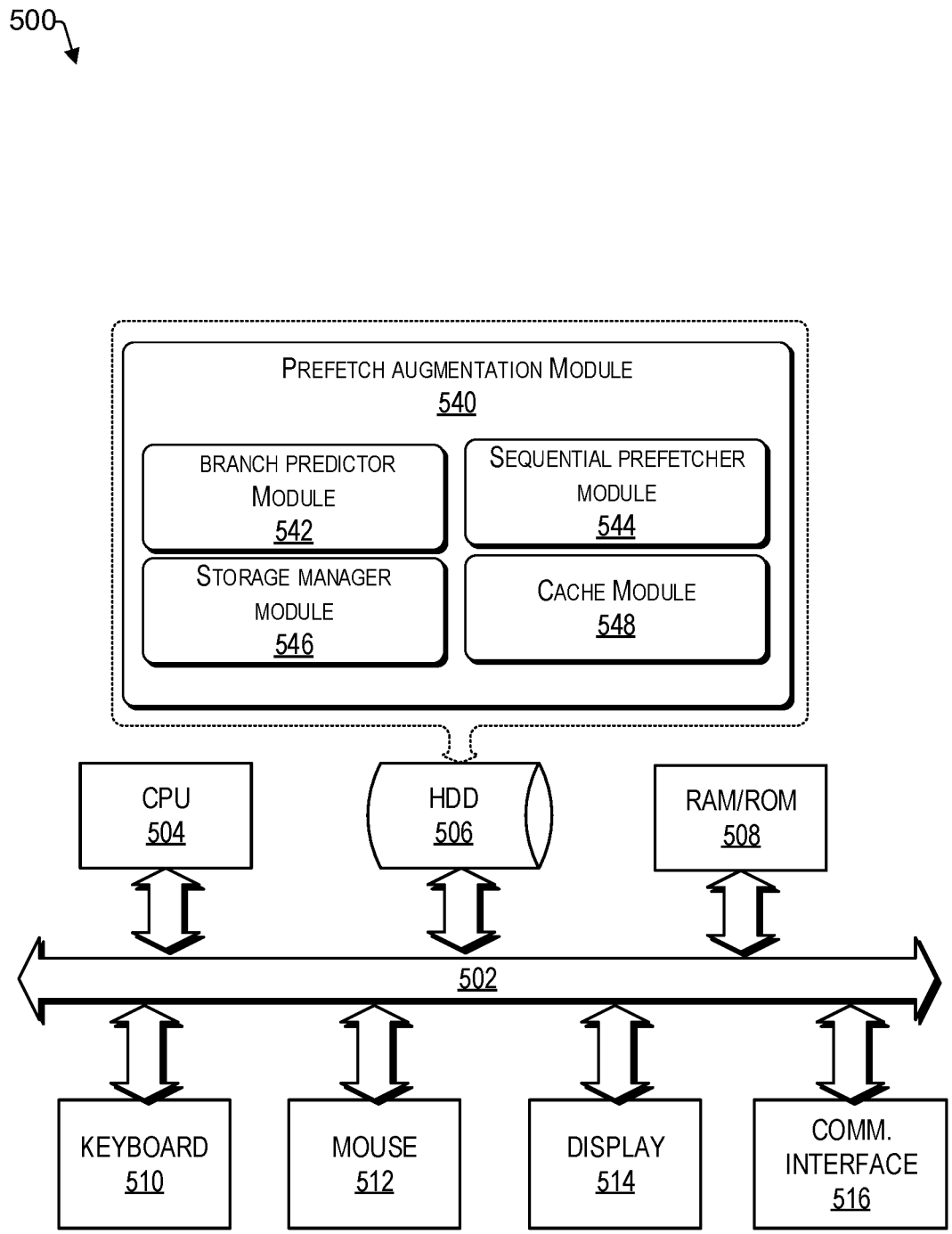
FIG. 5 is a functional block diagram illustration of a particularly configured computer hardware platform, consistent with an illustrative embodiment.

FIG. 5 provides a functional block diagram illustration 500 of a computer hardware platform, as may be used to implement the method shown in FIG. 4. The computer platform 500 may include a central processing unit (CPU) 504, a hard disk drive (HDD) 506, random access memory (RAM) and/or read-only memory (ROM) 508, a keyboard 510, a mouse 512, a display 514, and a communication interface 516, which are connected to a system bus 502. The HDD 506 can include data stores.

In one embodiment, the HDD 506 has capabilities that include storing a program that can execute various processes that can include subroutines calling other subroutines.

In FIG. 5, there are various modules shown as discrete components for ease of explanation. However, it is to be understood that the functionality of such modules and the quantity of the modules may be fewer or greater than shown.

The prefetch augmentation module 540 is configured to control the operation of the modules 542-548 to perform the various operations associated with performing a sequential prefetching that includes the added capability of identifying one or more long jumps in the code in advance and using information stored in the link stack to trigger non-sequential prefetching ahead of function call returns.

The branch predictor module 542 is configured to perform branch prediction by pushing on to a link stack the address of functions which call other functions prior to finishing execution of a current function, so as to be able to identify a return from a next function called by the current function to complete execution of the current function.

The sequential prefetcher module 544 is configured to prefetch cache lines consecutive to a current line, and to prefetch one or more long jumps in the program code by using information stored in the link stack to prefetch stream lines of non-sequential return calls.

The storage manager module 546 is configured to manage the cache storage and other storage to ensure that the processor does not have stall episodes where the processor is waiting for storage to be retrieved from the non-cached storage. The use of function return calls is made more efficient by having the address of the uncomplete function in cache for the processor to quickly receive through the pipeline and execute. The storage manager module 546 in conjunction with the branch predictor can increase the probability that stream lines will be available in cache for the processor. The cache module 548 is a cache storage configured to store predict stream lines when they are function calls, to be able to provide a fast return of the unfinished function that called another function to be completed without processing stalls.

Figure 6:
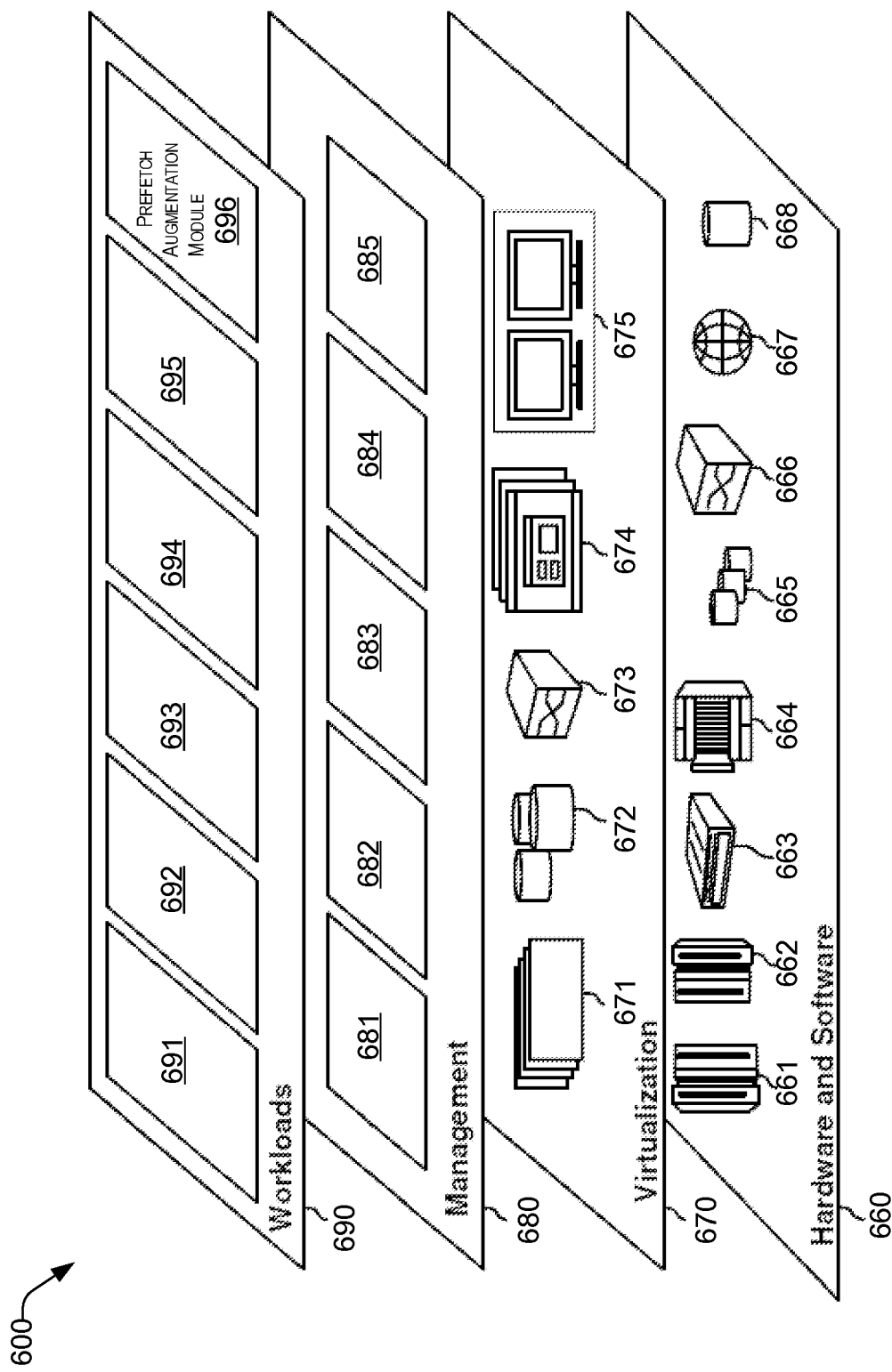
FIG. 6 depicts a set of functional abstraction layers, consistent with an illustrative embodiment.

Referring now to FIG. 6, a set of functional abstraction layers 600 is shown. It should be understood in advance that the components, layers, and functions shown in FIG. 6 are intended to be illustrative only and embodiments of the disclosure are not limited thereto. As depicted, the following layers and corresponding functions are provided:

Hardware and software layer 660 include hardware and software components. Examples of hardware components include: mainframes 661; RISC (Reduced Instruction Set Computer) architecture-based servers 662; servers 663; blade servers 664; storage devices 665; and networks and networking components 666. In some embodiments, software components include network application server software 667 and database software 668.

Virtualization layer 670 provides an abstraction layer from which the following examples of virtual entities may be provided: virtual servers 671; virtual storage 672; virtual networks 673, including virtual private networks; virtual applications and operating systems 674; and virtual clients 675.

In one example, management layer 680 may provide the functions described below. Resource provisioning 681 provides dynamic procurement of computing resources and other resources that are utilized to perform tasks within the cloud computing environment. Metering and Pricing 682 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 683 provides access to the cloud computing environment for consumers and system administrators. Service level management 684 provides cloud computing resource allocation and management such that required service levels are met. Service Level Agreement (SLA) planning and fulfillment 685 provide pre-arrangement for, and procurement of, cloud computing resources for which a future requirement is anticipated in accordance with an SLA.

Workloads layer 690 provides examples of functionality for which the cloud computing environment may be utilized. Examples of workloads and functions which may be provided from this layer include: mapping and navigation 691; software development and lifecycle management 692; virtual classroom education delivery 693; data analytics processing 694; transaction processing 695; and a module 696 configured for performing a link stack based prefetch augmentation, as discussed herein above.

CONCLUSION

The descriptions of the various embodiments of the present teachings have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

While the foregoing has described what are considered to be the best state and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications, and variations that fall within the true scope of the present teachings.

The components, steps, features, objects, benefits, and advantages that have been discussed herein are merely illustrative. None of them, nor the discussions relating to them, are intended to limit the scope of protection. While various advantages have been discussed herein, it will be understood that not all embodiments necessarily include all advantages. Unless otherwise stated, all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

Numerous other embodiments are also contemplated. These include embodiments that have fewer, additional, and/or different components, steps, features, objects, benefits and advantages. These also include embodiments in which the components and/or steps are arranged and/or ordered differently.

The flowchart, and diagrams in the figures herein illustrate the architecture, functionality, and operation of possible implementations according to various embodiments of the present disclosure.

While the foregoing has been described in conjunction with exemplary embodiments, it is understood that the term "exemplary" is merely meant as an example, rather than the best or optimal. Except as stated immediately above, nothing that has been stated or illustrated is intended or should be interpreted to cause a dedication of any component, step, feature, object, benefit, advantage, or equivalent to the public, regardless of whether it is or is not recited in the claims.

It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any such actual relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a" or "an" does not, without further constraints, preclude the existence of additional identical elements in the process, method, article, or apparatus that comprises the element.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments have more features than are expressly recited in each claim. Rather, as the following claims reflect, the inventive subject matter lies in less than all features of a single disclosed embodiment. Thus, the following claims are hereby incorporated into the Detailed Description, with each claim standing on its own as a separately claimed subject matter.

What is claimed is:

1. A computer-implemented method of performing a link stack based prefetch augmentation using sequential prefetching, the method comprising:
    observing a call instruction in a program being executed;
    pushing a return address onto a link stack for processing a next instruction;
    prefetching a stream of instructions starting from a cache line address of the next instruction;
    upon determining that the stream of instructions prefetched into the instruction cache has been overwritten:
        performing a function call return of the next instruction after processing of the next instruction has ended; and
        re-performing a prefetching of the stream of instructions starting from the cache line address of the next instruction; and
    storing the stream of instructions in an instruction cache.

2. The computer-implemented method of claim 1, further comprising:
    observing another call instruction prior to returning from the call instruction;
    pushing a return address onto the link stack for processing a new next instruction; and
    prefetching a stream of lines starting from a cache line that includes the new next instruction.

3. The computer-implemented method of claim 2, wherein the return address of the new next instruction and a return address of the next new instruction are non-sequential, and the method further comprising:
    performing a branch prediction using a call graph information to predict a next non-sequential address to which the program will jump; and
    prefetching instructions from the predicted next non-sequential address.

4. The computer-implemented method of claim 3, further comprising:
    processing the prefetched instructions from the next non-sequential address; and
    storing a result of executed prefetched instructions in a cache memory coupled to a processing pipeline, prior to requesting the prefetched instructions at the predicted next non-sequential address.

5. The computer-implemented method of claim 1, further comprising popping the address of the next instruction off the link stack after being processed, and prefetching one or more streams of instructions.

6. The computer-implemented method of claim 1, further comprising:
    predicting one or more subroutines to be called by the program being executed;
    instructing the sequential prefetcher to prefetch addresses of the predicted subroutines; and
    storing the prefetched addresses of the predicted subroutines in a cache memory coupled to a processing pipeline.

7. The computer-implemented method of claim 6, further comprising:
    processing instructions of the predicted subroutines; and
    storing a result of the processed instructions in the cache memory.

8. The computer-implemented method of claim 1, further comprising:
    identifying one or more jumps in a program code in advance of a function call return; and
    performing a non-sequential prefetching using information stored in the link stack.

9. A computing device configured to perform a link stack based prefetch augmentation, the computing device comprising:
    a processor;
    a memory coupled to the processor;
    a sequential prefetcher coupled to the memory;
    wherein the memory stores instructions that when executed by the processor cause the processor to perform acts comprising:
    calling a function using a next call instruction;
    pushing a return address of the next call instruction onto a link stack for processing of the next instruction;
    prefetching a stream of instructions starting from a return address of the next instruction;
    upon determining that the stream of instructions has been overwritten:
        performing a function call return of the next call instruction after processing the function referenced by the next call instruction has ended; and
        re-performing a prefetching of the stream of instructions starting from the return address of the next instruction; and
    arranging the stream of instructions into an instruction cache.

10. The computing device of claim 9, wherein the instructions cause the processor to perform additional acts comprising:
    calling a function using a new next call instruction prior to completing a processing of the function referenced by the next call instruction;
    pushing a new next return address onto the link stack; and
    prefetching a stream of lines starting from a cache line that includes the new next return address.

11. The computing device of claim 10, wherein:
the return address of the next call instruction and a return address of the new next new call instruction are non-sequential; and
the instructions cause the processor to perform additional acts of:
performing a branch prediction using a call graph information to predict a next non-sequential address to which the program will jump; and
prefetching instructions from the predicted next non-sequential address.

12. The computing device of claim 10, wherein the instructions cause the processor to perform additional acts comprising:
processing the prefetched instructions from a next non-sequential address; and
storing a result of the processed prefetched instructions in a cache memory coupled to a pipeline of the processor, prior to requesting the instructions from the next non-sequential address.

13. The computing device of claim 9, wherein the instructions cause the processor to perform additional acts comprising:
popping the next instruction off the link stack after processing the next instruction in the link stack; and
prefetching one or more streams of instructions starting from cache lines having one or more top addresses stored in the link stack.

14. The computing device of claim 9, wherein the instructions cause the processor to perform additional acts comprising:
predicting subroutines to be called by the program;
instructing the sequential prefetcher to prefetch instructions of the predicted subroutines; and
storing the prefetched instructions of the predicted subroutines in a cache memory coupled to a processing pipeline.

15. The computing device of claim 14, wherein the instructions cause the processor to perform additional acts comprising:
processing the predicted subroutines; and
storing a result of the processed predicted subroutines in the cache memory.

16. The computing device of claim 9, wherein the instructions cause the processor to perform additional acts comprising:
identifying one or more jumps in a program code in advance of a function call return; and
performing a non-sequential prefetching using information stored in the link stack.

17. A non-transitory computer readable storage medium tangibly embodying a computer readable program code having computer readable instructions that, when executed, causes a computer device to carry out a method of performing a link stack based prefetch augmentation using sequential prefetching, the method comprising:
observing a call instruction in a program being executed and pushing a return address onto a link stack for processing instructions;
prefetching a stream of instructions starting from the pushed return address of the call instruction;
upon determining that the stream of instructions has been overwritten:
performing a function call return of the next call instruction after processing the function referenced by the next call instruction has ended; and
re-performing a prefetching of the stream of instructions starting from the return address of the next instruction; and
storing the stream of instructions into an instruction cache.

18. The non-transitory computer readable storage medium according to claim 17, further comprising instructions to carry out the method comprising:
observing another call instruction prior to returning from the call instruction;
pushing the new next instruction onto the link stack; and
prefetching a stream of lines starting from a cache line that includes the new next instruction.

* * * * *